United States Patent
Tang et al.

(10) Patent No.: US 9,367,410 B2
(45) Date of Patent: Jun. 14, 2016

(54) FAILOVER MECHANISM IN A DISTRIBUTED COMPUTING SYSTEM

(71) Applicant: Facebook, Inc., Menlo Park, CA (US)

(72) Inventors: Liyin Tang, Fremont, CA (US); Rishit Manit Shroff, Sunnyvale, CA (US); Amitanand S. Aiyer, Sunnyvale, CA (US); Arjen Roodselaar, Redwood City, CA (US)

(73) Assignee: Facebook, Inc., Menlo Park, CA (US)

( * ) Notice: Subject to any disclaimer, the term of this patent is extended or adjusted under 35 U.S.C. 154(b) by 151 days.

(21) Appl. No.: 14/484,618

(22) Filed: Sep. 12, 2014

(65) Prior Publication Data

US 2016/0077936 A1 Mar. 17, 2016

(51) Int. Cl.
G06F 11/07 (2006.01)
G06F 11/20 (2006.01)
G06F 11/14 (2006.01)

(52) U.S. Cl.
CPC ........ G06F 11/2033 (2013.01); G06F 11/1471 (2013.01); G06F 2201/805 (2013.01); G06F 2201/84 (2013.01)

(58) Field of Classification Search
CPC .......................... G06F 11/2023; G06F 11/2033
USPC .................................................. 714/4.11, 6.3
See application file for complete search history.

(56) References Cited

U.S. PATENT DOCUMENTS

| | | | | |
|---|---|---|---|---|
| 7,716,348 B1* | 5/2010 | Redding | .................. | G06F 21/10 705/59 |
| 2004/0139125 A1* | 7/2004 | Strassburg | .......... | G06F 11/2064 |
| 2012/0096106 A1* | 4/2012 | Blumofe | ................ | G06Q 50/00 709/213 |
| 2013/0151895 A1* | 6/2013 | Lee | ..................... | G06F 11/1658 714/19 |
| 2013/0198133 A1* | 8/2013 | Lee | ................... | G06F 17/30581 707/611 |
| 2013/0304694 A1* | 11/2013 | Barreto | ............. | G06F 17/30282 707/608 |
| 2014/0337491 A1* | 11/2014 | Barreto | ............. | G06F 17/30194 709/221 |
| 2015/0278039 A1* | 10/2015 | Bogdanov | ........... | G06F 11/2023 714/4.11 |
| 2015/0301910 A1* | 10/2015 | Sathyanarayana | .. | G06F 11/1658 714/4.11 |
| 2015/0347250 A1* | 12/2015 | Kim | .................... | G06F 11/2082 714/4.11 |

OTHER PUBLICATIONS

Ongaro, D. et al., "In Search of an Understandable Consensus Algorithm (Extended Version)", Stanford University, pp. 1-18, May 20, 2014.

* cited by examiner

*Primary Examiner* — Chae Ko
(74) *Attorney, Agent, or Firm* — Perkins Coie LLP

(57) ABSTRACT

The disclosure is directed to failover mechanisms in a distributed computing system. A region of data is managed by multiple region servers. One of the region servers is elected as a "leader" and the remaining are "followers." The leader serves the read/write requests from a client. The leader writes the data received from the client into the in-memory store and a local write-ahead log ("WAL"), and synchronously replicates the WAL to the followers. A region server designated as an "active" region server synchronizes a distributed data store with the data from the WAL. Active witness followers apply the data from the WAL to their in-memory store while shadow witness followers do not. Different types of servers provide failover mechanisms with different characteristics. A leader is elected based on their associated ranks—higher the rank, higher the likelihood of electing itself as a leader.

19 Claims, 6 Drawing Sheets

FAILOVER MECHANISM IN A DISTRIBUTED COMPUTING SYSTEM

BACKGROUND

Failover mechanisms of current distributed computing systems are inefficient. Some current distributed computing systems have clusters of servers serving a client. For example, they have a master server and a slave server. The master server replicates the data to the slave servers in other clusters asynchronously. If the master goes down, then one of the slaves turns into master and serves the clients. When a section of the network fails, the distributed computing system fails over from one cluster to another cluster. One of the problems in such distributed computing systems is that since the replication is asynchronous, when the data is replicated from one cluster onto the other, there is no guarantee how long it takes for the data to be received at the other cluster. This replication can consume significant time, e.g., hours or even days, especially if the amount of data in the cluster is significantly large.

Accordingly, if the servers or the network fails in a particular cluster, there exists data that is written to the master server that has not yet replicated to the other clusters. Consequently, the users of the distributed computing system may experience data loss if the servers from the particular cluster are failed over to the other cluster. If the distributed computing system has to ensure that the users do not experience data loss, it may need to wait until all of the servers in the cluster have replicated data to the other cluster, which can consume significant time, and then fail over to serve the clients. Furthermore, current distributed computing systems do not have an efficient way of selecting one of the servers as a master server.

DETAILED DESCRIPTION

Figure 1:
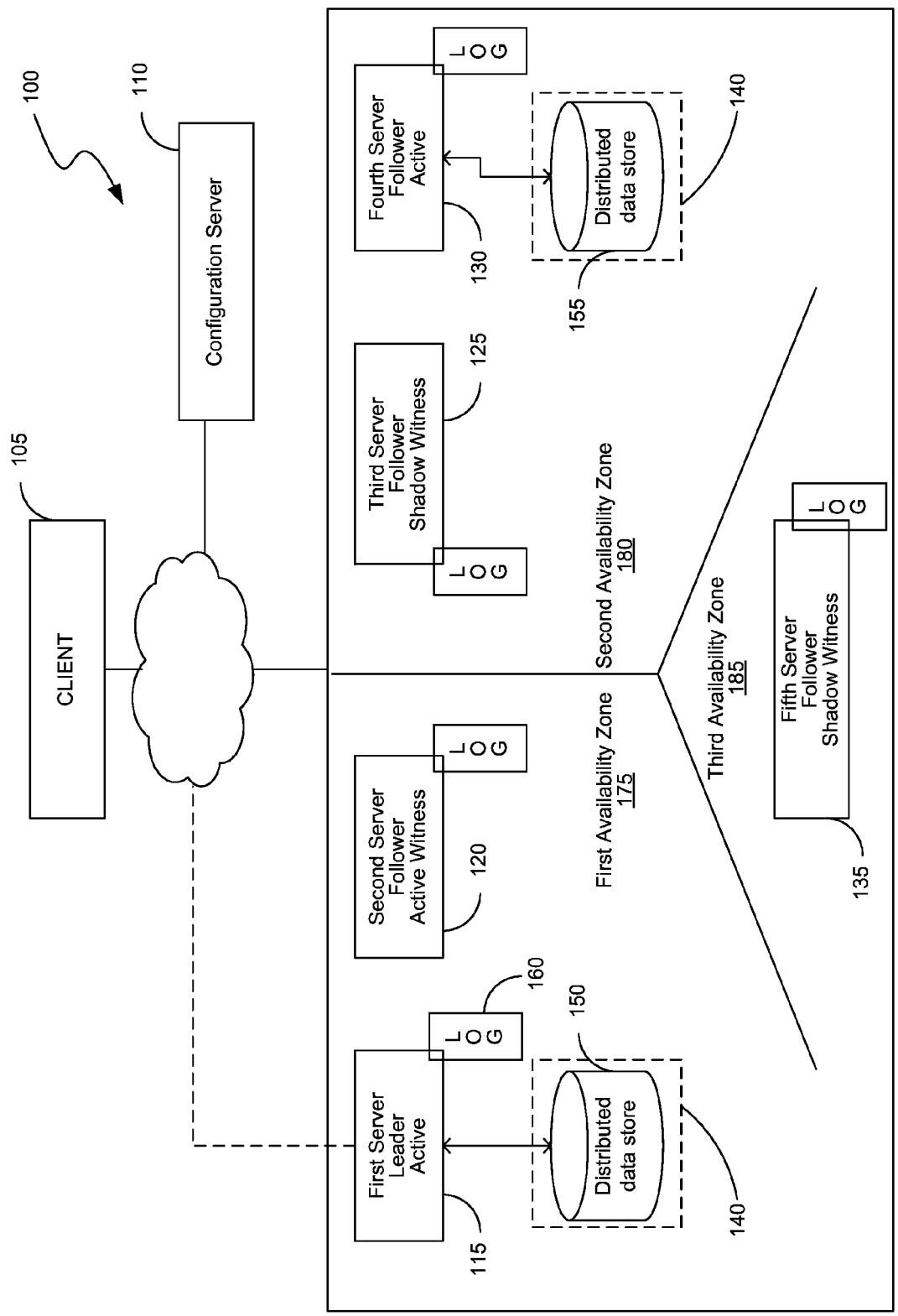
FIG. 1 is a block diagram illustrating a distributed computing system in which the failover mechanisms can be implemented.

The disclosed embodiments are directed to failover mechanisms in a distributed computing system. In the distributed computing system, a dataset is divided into a number of partitions, also referred to as "regions," and the dataset for each region is managed by a number of region server computing devices ("region servers") spread across a number of availability zones. One of the region servers is designated (e.g., elected) as a "leader" and the remaining servers are designated as "followers." Read and/or write requests received from client computing devices ("clients") are served only by the leader server. When a new dataset is received from a client whose data is stored in a particular region, the leader server of that particular region writes the data into an in-memory store of the leader server and a log file, which is stored at a local storage of the leader server. In some embodiments, the log file has a copy of the data written to the in-memory store. The leader server also synchronously replicates the log file to the followers. In so doing, when a current leader fails, one of the followers can become a new leader and serve the requests from the client without experiencing data loss. The leader replicates the log file to the followers based on one or more protocols, e.g., a Raft protocol.

The region servers push the data from an in-memory store (or a log file) to a persistent distributed data store, e.g., a Hadoop distributed file system (HDFS). The region servers may be distributed across availability zones. Each of the availability zones can be spread across a geographical region. An availability zone can include one or more servers that are designated as "active," "active witness," or "shadow witness" in addition to being designated as a leader or follower. A region server designated as active is permitted to update the distributed data store of that availability zone. In other words, updating of the distributed data store of an availability zone is restricted to the active server of the availability zone. The active server updates the distributed data store by writing data from a log file to the distributed data store.

A region server designated as active witness receives a copy of the log file from the leader server and applies the log file to (or synchronizes with) its in-memory store so that the in-memory store has the latest data from the leader, whereas a shadow witness server receives a copy of the log file but does not apply it to its in-memory store. One of the advantages of having an active witness region server is that when the leader server fails, the active witness region server can start serving the requests from the client system with minimum fail over time since the active witness region server already includes the updated data in the in-memory store. Similarly, when an active server fails, the active witness server can assume the role of an active server without any loss of time and without experiencing data loss.

The disclosed embodiments elect a leader based on a rank associated with each of the region servers. Ranks are assigned to the region servers at configuration time, and a region server with a higher rank has a higher likelihood of electing itself as a leader over lower ranked region servers. Each of the region servers has a timer upon the expiry of which an election is performed by the corresponding region server to elect itself a leader. In some embodiments, the timer of the region servers are set to expire based on the ranks of the servers—the higher the rank, the earlier the timer expires. When a current leader fails, a region server that has a highest rank among the remaining servers in the region can be elected as a new leader. In some embodiments, the active witness servers may be ranked higher than shadow witness servers. In some embodiments, the region servers that are more geographically proximate (e.g., nearby) to a client are ranked higher than regional servers that are less proximate (e.g., farther away).

The disclosed embodiments provide a highly available distributed computing system with minimum failover times. The distributed computing system provides failover mechanisms that have varied failover times. Some failover mechanisms take less time than others, but consume more storage capacity. The administrator can choose a particular failover mechanism as a tradeoff between time and other system resources, e.g., storage capacity. For example, failing over to an active witness server can consume less time as the latest data from the leader server is already available in the in-memory store of the active witness server (e.g., the log is applied to the in-memory store when received from the leader), but at the cost of higher storage consumption. A shadow witness server on the other hand consumes relatively less storage because the log file from the leader is not applied to the shadow witness server's in-memory store but the time required to failover to the shadow witness server is higher because data from its log file has to be synchronized with its in-memory store before it is ready to serve the client.

Furthermore, the disclosed embodiments provide failover mechanisms per region of the distributed computing system, e.g., using a set of region servers spanning a number of availability zones. The distributed computing system can thus withstand a failure of more than one region server.

Environment

FIG. 1 is a block diagram illustrating a distributed computing system 100 in which the failover mechanisms can be implemented. The distributed computing system 100 includes a number of region servers, e.g., a first server 115, a second server 120, a third server 125, a fourth server 130 and a fifth server 135, that each can host a region of data associated with the distributed computing system 100. A dataset associated with the distributed computing system 100 is divided into a number of regions/partitions and each region/partition is managed by a set of region servers. For example, region 140 is managed by the region servers 115-135. In some embodiments, the distributed computing system 100 can be a social networking application. For example, the distributed computing system 100 can be a social networking application such as Facebook of Menlo Park, Calif., and the data associated with distributed computing system 100 can be user data, e.g., user profiles, status updates, messages, pictures etc. The user data can be divided into a number of regions and each region can include user data of a subset of the users.

A client whose data is stored in a particular region is served by one or more of the region servers of that particular region. For example, the client 105 whose data is stored in the region 140 is served by the region servers 115-135 that host the region 140. The region servers are spread across various availability zones. For example, region servers 115 and 120 are in a first availability zone 175, region servers 125 and 130 are in a second availability zone 180 and region server 135 is in a third availability zone 185. In some embodiments, the availability zones are spread across geographical locations.

The region servers can have different roles in the distributed computing system 100. A region server can be a leader that serves (e.g., responds to) data access requests (e.g., read and/or write requests) received from clients, or can be a follower that participates in data replication to receive a copy of the log file from the leader. A region server can be an active server that is responsible for updating a distributed data store in the availability zone with the data received from the clients. An active witness server is a follower whose in-memory store is also synchronized with the copy of the log file received from the leader server. A shadow witness server is a follower whose in-memory store is not synchronized with the copy of the log file received from the leader server. In some embodiments, the active server also synchronizes its in-memory store with a copy of the log file received from the leader server. Note that while the scope of roles leader and follower is across availability zones, the scope of the roles active, active witness and shadow witness is restricted to a particular availability zone.

In the distributed computing system 100, the first server 115 is a leader server for the region 140 and the servers 120-135 are followers for the region 140. Further, the first server 115 is also an active server for the first availability zone 175, the second server 120 is an active witness server for the first availability zone 175, the third server 125 is a shadow witness server and the fourth server 130 is an active server for the second availability zone 180, and the fifth server 135 is a shadow witness server for the third availability zone 185.

In some embodiments, the configuration of the region servers for different roles can be performed by a configuration server 110. The configuration server 110 can be implemented as an independent server or as a distributed server, e.g., the modules of the configuration server 110 can be distributed across the region servers or other servers. For example, the process of configuring the region servers for various roles, e.g., active server, active witness server, shadow witness server, can be implemented in the leader server. In another example, the process for electing a leader among the region servers can be implemented on all of the region servers. A user, e.g., an administrator of the distributed computing system 100, can program the configuration server 110 to configure the servers 115-135 for one or more roles. One or more of the availability zones include a distributed data store that stores data of a particular region, e.g., region 140. The distributed data store is accessible by all the region servers of that availability zone. For example, the first availability zone 175 includes a distributed data store 150 and the second availability zone 180 includes a distributed data store 155 to store the data associated of the region 140. In some embodiments, the data received from the client 105 is part of the region 140, and is therefore stored in the distributed data stores 150 and 155. The distributed data store can be implemented in various configurations. In some embodiments, the distributed data store is implemented as HDFS. One of the reasons the distributed data store is implemented as a distributed data store is when the distributed computing system 100 fails over from one region server to another region server, the data is readily available for the other region server to serve the client.

The client 105 may communicate with the servers 115-135 over a communication network. The communication network can be any of various types of communication networks, e.g., Internet, local area network (LAN), wide area network (WAN), etc. When the distributed computing system 100 receives a data access request, e.g., write request, from the client 105, the leader server 115 receives the dataset from the client 105 and writes the dataset to the log file 160, which is stored at a local storage device (not illustrated) associated with the leader server 115, and also to an in-memory store of the leader server 115. In some embodiments, the region servers can be implemented to store the dataset using a log structure merge tree ("LSM tree") database management system. The LSM tree is a data structure that is employed in applications that require indexed access to data with high throughput. LSM trees typically have an in-memory portion and an on-disk portion. The in-memory portion, which is the in-memory store of the leader server 115, can be the MemStore of the LSM tree database. When the MemStore reaches a particular threshold size, the data from the MemStore is flushed to the distributed data store. The log file 160 can be implemented as a Write-Ahead-Log (WAL) of the LSM tree.

After the leader server 115 writes the data to the log 160, the leader server 115 replicates the log 160 to the followers synchronously. The leader server 115 replicates the log 160 based on a protocol, e.g., a Raft protocol. In some embodiments, Raft is a consensus algorithm for solving consensus in a group of computing systems. Consensus is the process of agreeing on one result among a group of participants. Raft offers a generic way to distribute a state machine across groups of computing systems, ensuring that each node in the group agrees upon the same series of state transitions.

While the leader server 115 replicates the log 160 to all the followers 120-135 in the availability zones 175-185 synchronously, the leader server 115 waits for a majority of the followers 120-135 to acknowledge the receipt of a copy of the log 160. After a majority of the followers 120-135 acknowledge the receipt of a copy of the log 160, the leader server 115 acknowledges the client 105 of the receipt of the dataset. The follower servers 120-135 store a copy of the log 160 at their respective local storage devices (not illustrated).

The data from the in-memory store (or the log) is written to the distributed data stores by the active servers. For example, in the first availability zone 175, the active server 115 writes the data from the in-memory store (or the log 160) to the distributed data store 150. Similarly, in the second availability zone 180, the active server 130 writes the data from its in-memory store (or the log) to the distributed data store 155. Since there is no distributed data store in the third availability zone 185, the third availability zone 185 does not have an active server. In some embodiments, the data from the in-memory store (or the log 160) is written to the distributed data store 150 when the size of the in-memory store of the active server 115 reaches a particular threshold.

By replicating the log 160 from leader server 115 to other region servers 120-135 and writing the data from the log to the distributed data stores across the region, the distributed computing system 100 ensures that the data from the client 105 is readily available for any of the region servers 120-135 to serve client requests in case of a failure of the leader server 115. In case of a failure of the leader server 115, the distributed computing system 100 can elect one of the follower servers 120-135 as a new leader and fail over from the leader server 115 to the new leader, which can then serve any client requests. For example, when the first server 115 fails, the second server 120 can elect itself as the new leader. The second server 120 can serve the data access requests from the client 105 with almost no delay since the in-memory store of the second server 120 has the latest data from the leader server 115, e.g., log 160, as it is an active witness server. If the leader server 115 is failed over to a shadow witness, e.g., third server 125, since the third server 125 does not have the data from the log 160 applied to the in-memory store, there may be a minimum delay in applying the data from the log 160 to the in-memory store, before the third server 125 is ready to serve the requests.

Figure 2:
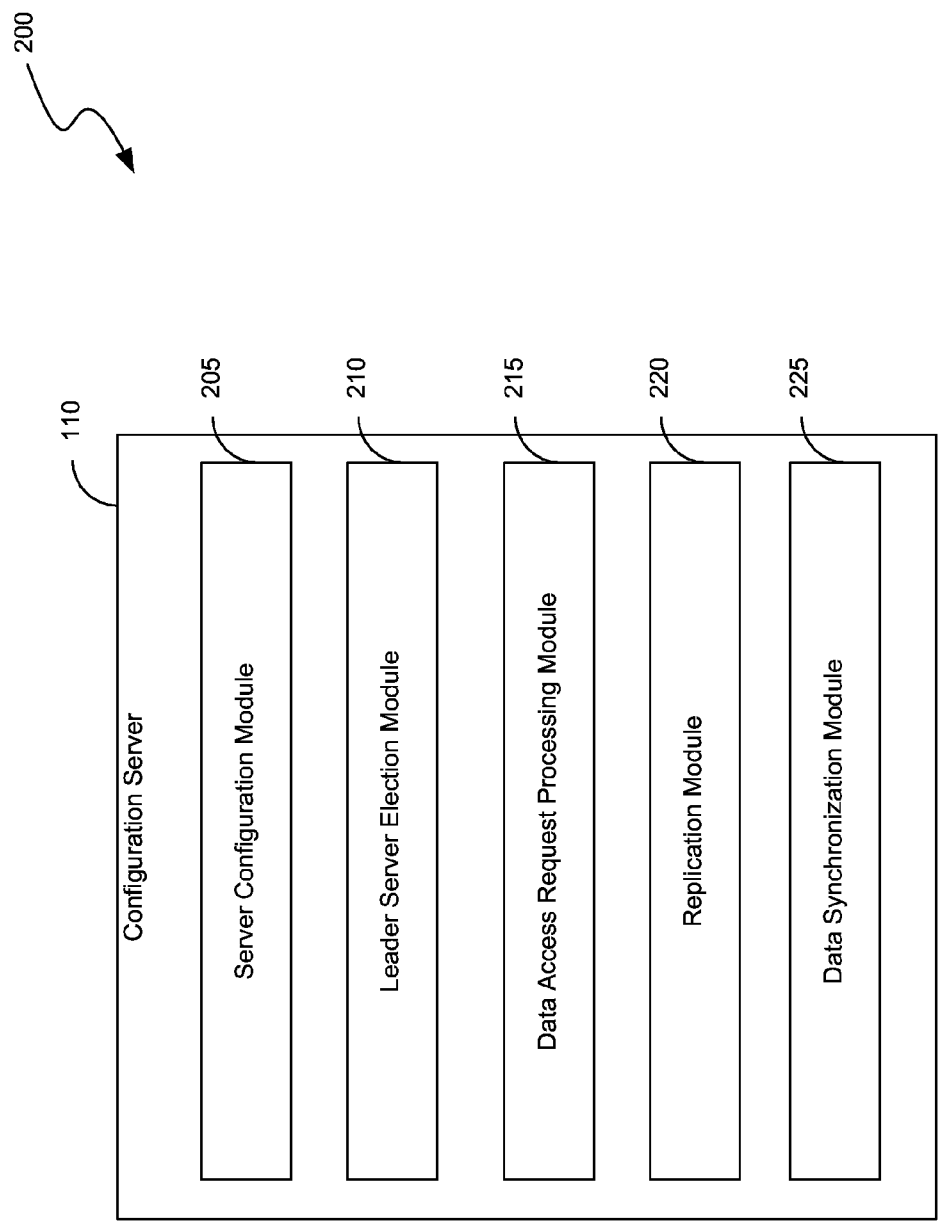
FIG. 2 is a block diagram of a configuration server of FIG. 1, consistent with various embodiments.

FIG. 2 is a block diagram 200 of the configuration server 110 of FIG. 1. The configuration server 110 can configure the region servers for different roles. The configuration server 110 can be implemented as an independent server or as a distributed server, e.g., the modules 205-225 can be distributed across one or more of the region servers or other servers. For example, the current leader for the region 140 can be the configuration server 110. In another example, the server configuration module 205 that configures the region servers for various roles, e.g., active server, active witness server, shadow witness server, can be implemented in the leader server. Typically, the responsibility of assigning roles to each of the region servers 115-135 is of the leader server. In another example, the leader server election module 210 for electing a leader among the region servers can be implemented on all the region servers. The leader election can be done by using the RAFT protocol, and the protocol can be implemented on all the region servers. A user, e.g., an administrator of the distributed computing system 100, can program the configuration server 110 to configure the servers 115-135 for one or more roles per the user's specification.

The configuration server 110 includes a server configuration module 205 that configures the region servers 115-135 as active, active witness or shadow witness servers. The server configuration module 205 can configure the region servers for various roles based on various criteria. For example, the region servers can be configured as active servers based on their proximity to the distributed data store, based on whether the region server is efficient in writing data, based on whether the region server has sufficient memory to store data received the leader in the in-memory store, etc. In some embodiments, if a region server does not have sufficient memory to store data from in-memory store of the leader, the region server may be configured as shadow witness. In some embodiments, if a particular availability zone does not have a distributed data store, the server configuration module 205 ensures that no region servers in the particular availability zone are configured as active or active witness servers, and configures them as shadow witness servers. Further, the server configuration module 205 ensures that an availability zone has no more than one active server.

The configuration server 110 includes a leader server election module 210 that elects one of the region servers 115-135 as a leader. In some embodiments, the leader server election module 210 elects a leader based on a rank associated with each of the region servers 115-135. In some embodiments, the rank can be a number. Ranks can be assigned to the region servers at configuration time, and a region server with a higher rank has a higher likelihood of electing itself as a leader over lower ranked region servers. The region servers can be assigned ranks based on various criteria. In some embodiments, the region servers that are more geographically proximate to a client are ranked higher than regional servers that are less proximate. In some embodiments, the region servers within an availability zone are ranked higher than regional servers of different availability zones. In some embodiments, active witness servers can be ranked higher than shadow witness servers.

For example, in the distributed computing system 100, the first server 115 can be the most geographically proximate to the client 105 and therefore, can be assigned a rank "5," rank "5" being the highest among ranks "1-5." The second server 120 is in the same availability zone as the leader server 115 and also an active witness server and therefore, can be assigned rank "4." The second server 120 is in the same availability zone as the leader server 115 and also an active witness server and therefore, can be assigned rank "4." The fourth server 130 is an active witness server and therefore, can be assigned rank "3." For the remaining ranks "2" and "1," between the third server 125 and fifth server 130, the third server 125 can be ranked higher over the fifth server 135 for at least two reasons—one, since the third server 125 is in the same availability zone as the "$3^{rd}$" ranked server, and two, since the third availability zone in which the fifth server 135 is located does not have a distributed data store. Thus, the third server 125 can be assigned rank "2," and the fifth server 135 can be assigned rank "1."

Each of the region servers has a timer upon the expiry of which an election is performed by the corresponding region server to elect itself a leader. In some embodiments, the timer of the region servers are set to expire based on the ranks of the servers—higher the rank, earlier the timer expires. The leader server election module 210 sets the time as a function of the rank of the region servers. In some embodiments, the duration of the timer can be determined by dividing a specified duration by rank. For example, if the specified duration is "10" minutes, then the timer of the leader server 115, which is assigned rank "5", is set to expire at "2" ("10/5=2") minutes, the timer of rank "4" server is set to expire at "2.5" ("10/4=2.5") minutes, so on and finally, the timer of rank "1" server is set to expire at "10" ("10/1=10") minutes. When the timer of the region server expires, the region server elects itself as a leader and announces the leadership to the other region servers, which then become followers.

Once a region server elects itself as a leader, the region server keeps sending a heartbeat, e.g., a ping, to the followers indicating that the region server is alive, functioning and in condition to respond to the client requests, and therefore is still the leader. The region server can send the heartbeat on a regular specified schedule. The followers reset their timer whenever they receive the heartbeat from the leader so that they keep their timers from expiring and avoid starting an election process to elect themselves as a leader.

When a current leader for a particular region fails, a region server that has a highest rank among the remaining servers that host the particular region can be elected as a new leader. When the leader server 115 stops sending the heartbeat, e.g., due to a failure of the first server 115 for any of various reasons, the follower servers 120-135 stop receiving the heartbeat and a follower whose timer expires next, e.g., the second server 120 which is ranked highest among the remaining followers, elects itself as the new leader.

The configuration server 110 includes a data access request module 215 that routes the data access requests from the client 105 to a region server that is the leader for the region 140. If the data access request is a write request, the data access request module 215 ensures that the dataset from the client 105 is written to the log 160 and the client 105 is acknowledged for the receipt of the dataset. If the data access request is a read request, the data access request module 215 ensures that the leader server 115 obtains the requested data from the in-memory store and/or the distributed data store and returns the information to the client 105.

The configuration server 110 includes a replication module 220 that replicates the log 160 from the leader server 115 to the followers 120-135. The replication module 220 replicates the log 160 to the followers synchronously, and based on a protocol, e.g., Raft protocol. After receiving an acknowledgement from a majority of the followers regarding a receipt of the copy of the data replicated from the leader server 115, the replication module 220 notifies the data access request processing module 215 regarding the acknowledgement, which then acknowledges the client 105 regarding the receipt of the dataset.

The configuration server 110 includes a data synchronization module 225 that synchronizes the distributed data stores with the data from the in-memory store of the active servers (or their logs). For example, the data synchronization module 225 synchronizes the distributed data store 150 with the data from the in-memory store (or the log 160) of the leader server 115. In some embodiments, the data is flushed from the in-memory store (or the log 160) when the in-memory store reaches a threshold size. If the distributed data store 150 is HDFS, then the data from the in-memory store is written to an "HFile" in the HDFS.

Figure 3:
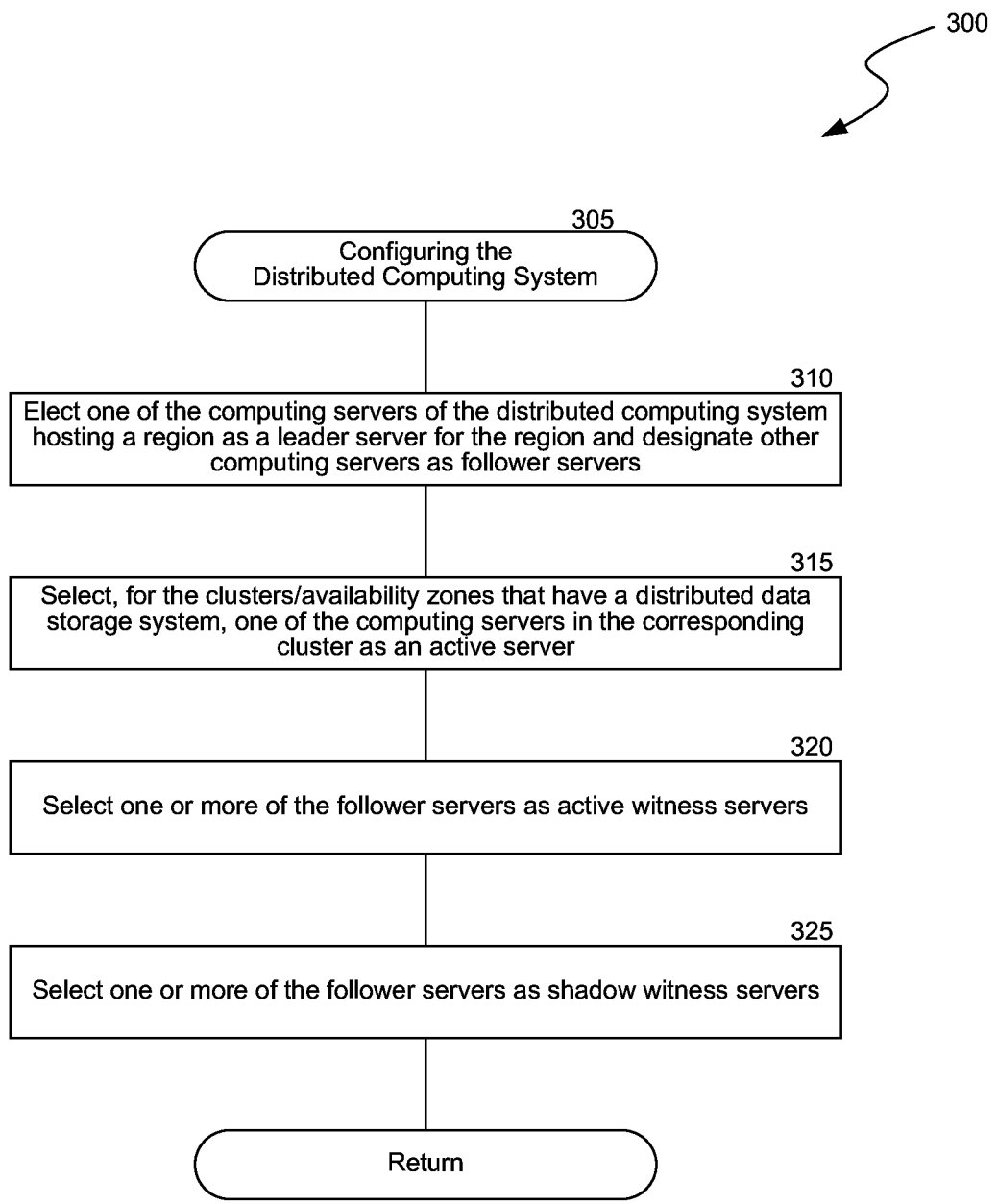
FIG. 3 is a flow diagram of a process of configuring the region servers of FIG. 1.

FIG. 3 is a flow diagram of a process 300 of configuring the region servers of FIG. 1. In some embodiments, the process 300 may be executed in the distributed computing system 100, and using the configuration server 110. The process 300 begins at block 305 and at block 310, the leader service election module 210 elects one of the region servers as a leader for a particular region and designates the remaining region servers as followers for the particular region. For example, in the distributed computing system 100, the first server 115 is elected as the leader for the region 140 and the region servers 120-135 are designated as followers for the region 140. In some embodiments, the election process (also described with reference to at least FIG. 4) for electing the leader is based on a rank associated with region servers. In some embodiments, all client requests for obtaining data from a particular region are served by the leader server only. The leader server stores the data received from the client in a log file, e.g., log 160, and replicates the log file to all the followers.

At block 315, the server configuration module 205 selects one or more of the region servers as an active server. As described above, an active server is a region server to which the synchronization of a distributed data store in an availability zone is restricted to. In some embodiments, the server configuration module 205 selects only one region server as the active server in an availability zone. Further, the server configuration module 205 selects an active server only for those availability zones that have a distributed data store since no synchronization is required if an availability zone does not have a distributed data store. For example, in the distributed computing system 100, the first server 115 is the active server in the first availability zone 175, the fourth server 130 is the active server in the second availability zone 180, and since there is no distributed data store in the in third availability zone 185, there is no active server in third availability zone 185.

At block 320, the server configuration module 320 selects one or more of the followers as active witness servers. As described above, an active witness server is a follower whose in-memory store is also synchronized with the copy of the log file received from the leader server. For example, in the distributed computing system 100, the second server 120 is an active witness server in the first availability zone 175. In some embodiments, the server configuration module 320 can select more than one region server in an availability zone as active witness servers. In some embodiments, if a particular availability zone does not have a distributed data store, the server configuration module 205 ensures that no region servers in the particular availability zone are configured as active witness servers.

At block 325, the server configuration module 320 selects one or more of the followers as shadow witness servers, and the process 300 returns. As described above, shadow witness server is a follower whose in-memory store is not synchronized with the copy of the log file received from the leader server. The combination of active witness servers and shadow witness servers provide varied failover mechanisms. Some failover mechanisms take shorter time than others but consume more storage capacity than others. For example, failing over to an active witness server can consume lesser time as the latest data from the leader server is already available in the in-memory store of the active witness server, but at the cost of higher storage consumption. A shadow witness server on the other hand consumes relatively less storage since the log file from the leader is not applied to the shadow witness server's in-memory store but the time required to failover to the shadow witness server is higher since data from its log file has to be synchronized with it's in-memory store before it is ready to serve the client.

Figure 4:
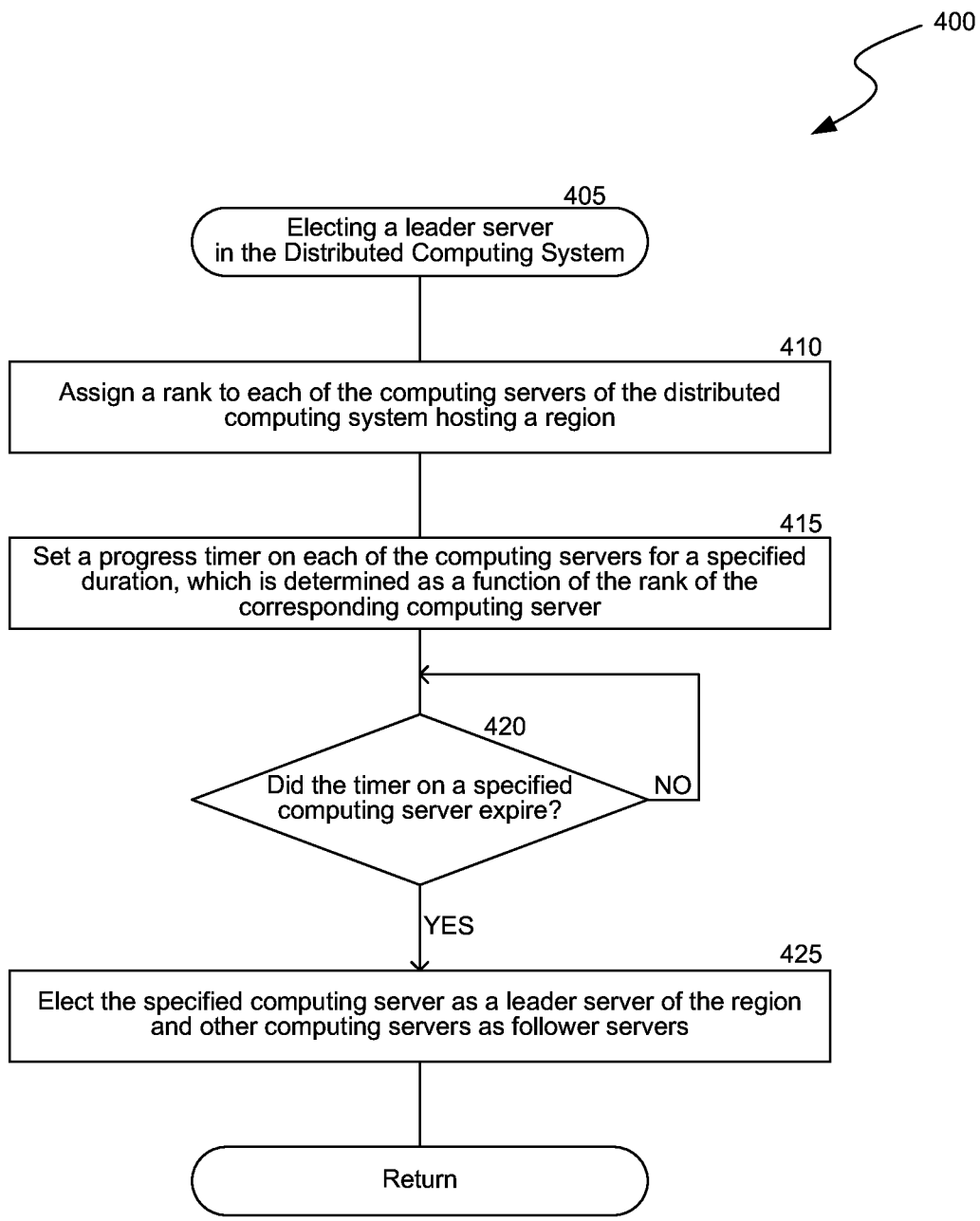
FIG. 4 is a flow diagram of a process for electing a leader of the region servers of FIG. 1.

FIG. 4 is a flow diagram of a process 400 for electing a leader of the region servers of FIG. 1. The process 400 can be implemented in the distributed computing system 100. The process 400 begins at block 405, and at block 410, the leader server election module 210 assigns a rank to each of the region servers. In some embodiments, the rank can be a number. Ranks can be assigned to the region servers at configuration time, and a region server with a higher rank has a higher likelihood of electing itself as a leader over lower ranked region servers. The region servers can be assigned ranks based on various criteria. In some embodiments, the region servers that are more geographically proximate to a client are ranked higher than regional servers that are less proximate to the client. In some embodiments, the region servers within an availability zone are ranked higher than regional servers of different availability zones. In some embodiments, active witness servers can be ranked higher than the shadow witness servers.

For example, in the distributed computing system 100, the first server 115 can be the most geographically proximate to the client 105 and therefore, can be assigned a rank "5," rank "5" being the highest among ranks "1-5." The second server 120 is in the same availability zone as the leader server 115 and is also an active witness server and therefore, can be assigned rank "4." The second server 120 is in the same availability zone as the leader server 115, and is also an active witness server and therefore, can be ranked higher over other remaining servers, e.g., as rank "4." The fourth server 130 is an active witness server and therefore, can be ranked higher over the remaining shadow witness servers, e.g., as rank "3." For the remaining ranks "2" and "1," between the third server 125 and fifth server 130, the third server 125 can be ranked higher over the fifth server 135 for at least two reasons—one, since the third server 125 is in the same availability zone as the "$3^{rd}$" ranked server, and two, since the third availability zone in which the fifth server 135 is located does not have a distributed data store. Thus, the third server 125 can be assigned rank "2," and the fifth server 135 can be assigned rank "1."

Note that the above ranking is just one example. The region servers 115-135 can be ranked based on other various criteria.

At block 415, the leader server election module 210 sets a progress timer on each of the region servers upon expiry of which an election is performed by the corresponding region server to elect itself a leader. In some embodiments, the timer of the region servers are set to expire based on the ranks of the servers—higher the rank, earlier the timer expires. The leader server election module 210 sets the time as a function of the rank of the region servers. In some embodiments, the duration of the timer can be determined by dividing a specified duration by rank. For example, if the specified duration is "10" minutes (which can be specified by a user, e.g., an administrator of the distributed computing system 100), then the timer of the leader server 115, which is assigned rank "5", is set to expire at "2" ("10/5=2") minutes, the timer of rank "4" server is set to expire at "2.5" ("10/4=2.5") minutes, so on and finally, the timer of rank "1" server is set to expire at "10" ("10/1=10") minutes.

At determination block 420, the leader server election module 210 determines whether the timer of any of the region server has expired. If the timer of any of the region servers has expired, then at block 425, the region server elects itself as a leader and announces the leadership to the other region servers, which then become followers. On the other hand if the timer has not expired, the process 400 continues to inspect the timer. To begin with, e.g., when all the region servers are booted initially, there may be no leader, but eventually the timer of the highest ranked region server expires the earliest, and therefore, the highest ranked server initiates an election process, elects itself as a leader announces its leadership to the other region servers. For example, in the distributed computing system 100, when the region servers 115-135 are booted together, the timer of the first server 115, which is ranked highest amongst the region server 115-135, expires first and therefore, causes the first server 115 to elect itself as a leader.

Once a region server elects itself as a leader, the region server keeps sending a heartbeat, e.g., a ping, to the followers indicating that the region server is alive, functioning and/or in condition to respond to the client requests, and therefore is still the leader. In some embodiments, the region server sends the heartbeat regularly or at specified intervals. The followers reset their timer upon receiving the heartbeat from the leader so that they can keep their timers from expiring and avoid starting an election process to elect themselves as a leader.

When a current leader for a particular region fails, a region server that is ranked highest among the remaining servers that host the particular region can be elected as a new leader. For example, when the leader server 115 stops sending the heartbeat, e.g., due to a failure of the first server 115 for any of various reasons, the follower servers 120-135 stop receiving the heartbeat and a follower whose timer expires next, e.g., the second server 120 which is ranked highest among the remaining followers, elects itself as the new leader.

Figure 5:
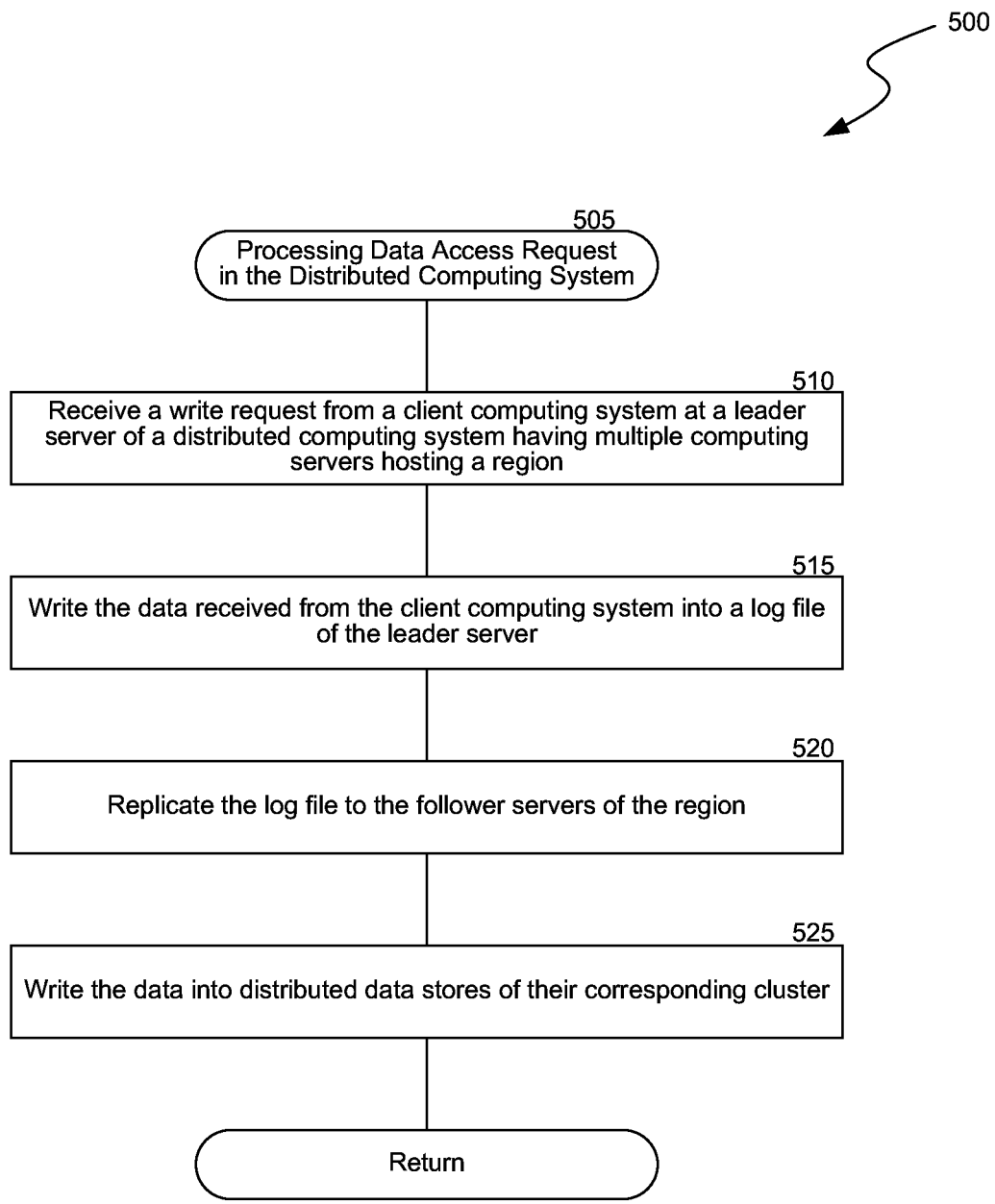
FIG. 5 is a flow diagram of a process for processing a data access request from a client in the distributed computing system of FIG. 1.

FIG. 5 is a flow diagram of a process 500 for processing a data access request from a client in the distributed computing system 100 of FIG. 1. The process 500 can be implemented in the distributed computing system 100. The process 500 begins at block 505, and at block 510, the data access request processing module 215 receives a data access request from a client, e.g., a write request from the client 105. The data access request can include a dataset that has to be written into the distributed computing system 100.

At block 515, the data access request processing module 215 writes the dataset to the in-memory store of the leader server. After writing the dataset into the in-memory store, the data access request processing module 215 also writes the data into the log file of the leader server. For example, in the distributed computing system 100, the data access request module 215 writes the dataset from the client 105 to the in-memory store of the leader server 115 and also to the log 160.

At block 520, the replication module 520 replicates the log file of the leader server to the follower servers of the region. The replication module 220 replicates the log to the followers synchronously, and based on a protocol, e.g., Raft protocol. For example, the replication module 220 replicates the log 160 to the followers 120-135. While the replication module 220 replicates the log 160 to all the followers 120-135 in the availability zones 175-185, it only waits for a majority of the followers 120-135 to acknowledge the receipt of a copy of the log 160. After a majority of the followers 120-135 acknowledge the receipt of a copy of the log 160, the leader server 115 acknowledges the client 105 of the receipt of the dataset. The follower servers 120-135 store a copy of the log 160 at their respective local storage devices (not illustrated).

At block 525, the data synchronization module 225 coordinates with the active servers to synchronize the distributed data stores with the log from the corresponding active servers. For example, the data synchronization module 225 causes the leader server 115, which is also the active server, to synchronize the distributed data store 150 with the data from the in-memory store (or the log 160) of the leader server 115. Similarly, the data synchronization module 225 causes the fourth server 130, which is the active server in the second availability zone 180, to synchronize the distributed data store 155 with the data from the in-memory store (or the log) of the fourth server 130. In some embodiments, the data is flushed from the in-memory store of the active server to the distributed store when the in-memory store reaches a specified threshold size.

Figure 6:
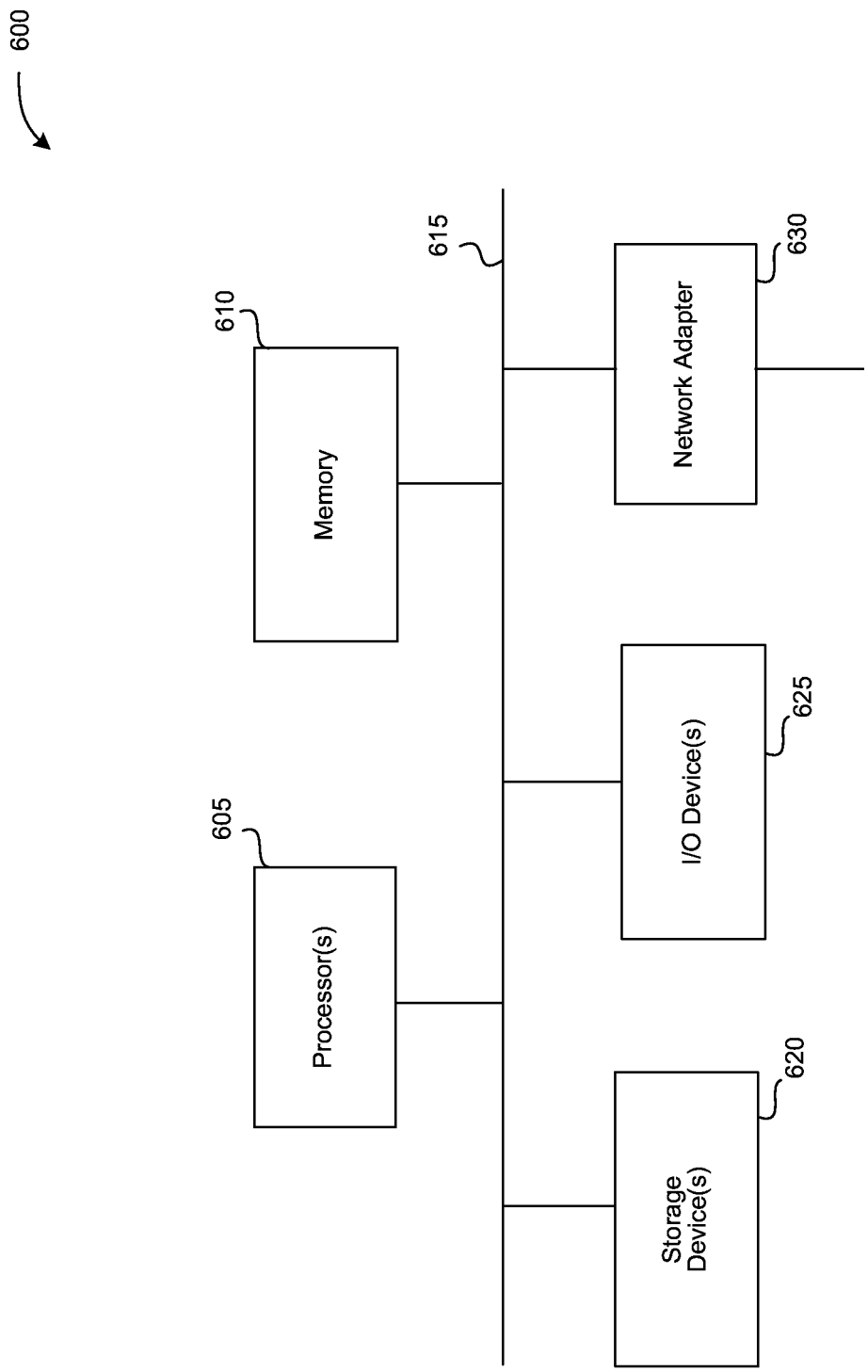
FIG. 6 is a block diagram of a computer system as may be used to implement features of some embodiments.

FIG. 6 is a block diagram of a computer system as may be used to implement features of some embodiments of the disclosed technology. The computing system 600 may be used to implement any of the entities, components or services depicted in the examples of FIGS. 1-9 (and any other components described in this specification). The computing system 600 may include one or more central processing units ("processors") 605, memory 610, input/output devices 625 (e.g., keyboard and pointing devices, display devices), storage devices 620 (e.g., disk drives), and network adapters 630 (e.g., network interfaces) that are connected to an interconnect 615. The interconnect 615 is illustrated as an abstraction that represents any one or more separate physical buses, point to point connections, or both connected by appropriate bridges, adapters, or controllers. The interconnect 615, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 610 and storage devices 620 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 610 can be implemented as software and/or firmware to program the processor(s) 605 to carry out actions described above. In some embodiments, such software or firmware may be initially provided to the processing system 600 by downloading it from a remote system through the computing system 600 (e.g., via network adapter 630).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A method performed by a computing system, comprising:
    receiving a data access request including a dataset from a client computing system at a distributed computing system, the distributed computing system including multiple computing servers hosting a region of data associated with the distributed computing system, the computing servers distributed across multiple clusters, wherein one of the computing servers is a leader server and a remaining of the computing servers are follower servers, and wherein some of the computing servers are active servers, active witness servers and shadow witness servers;
    writing, by the leader server, the dataset to a log file at a data storage system associated with the leader server;
    replicating, by the leader server, the log file to the follower servers, wherein the replicating includes:
        replicating an in-memory store of the leader server and the log file to the active witness servers, the in-memory store including data from the log file, and
        replicating the log file to the shadow witness servers; and
    updating, by an active server of the active servers, a distributed data storage system associated with a first cluster of the clusters to which the leader server belongs with the dataset from the log file.

2. The method of claim 1, wherein the leader server is one of the computing servers assigned to serve read-write requests received for the region.

3. The method of claim 1, wherein the active server is one of the computing servers in the first cluster assigned to update the distributed data storage system.

4. The method of claim 3, wherein the active server and the leader server are the same computing server of the computing servers.

5. The method of claim 1, wherein replicating the log file to the follower servers includes:
transmitting, by the leader server, the log file to the follower servers synchronously,
receiving, by the leader server, an acknowledgement from a majority of the follower servers regarding a receipt of the log file at the corresponding follower server, and
sending, by the leader server, an indication to the client computing system regarding a receipt of the dataset.

6. The method of claim 1 further comprising:
receiving a read request at the distributed computing system from the client computing system for a specified data set in the region;
obtaining, by the leader server and in response to the read request, the specified data set from the distributed data storage system; and
transmitting, by the leader server, the specified data set to the client computing system.

7. The method of claim 1, wherein one of the computing servers is elected as the leader server as a function of a rank associated with the corresponding computing server.

8. The method of claim 7, wherein electing the leader server includes:
setting a timer of a specified duration for each of the computing servers, the specified duration being a function of the rank of the corresponding computing server, wherein the timer of a higher ranked computing server expires before that of a lower ranked computing server,
determining that a timer of the one of the computing servers expired before that of a remaining of the computing servers, and
selecting the one of the computing servers as the leader server.

9. The method of claim 7, wherein a computing server of the computing servers that is geographically closest to the client computing system is assigned a highest rank among the computing servers.

10. The method of claim 1 further comprising:
determining that the leader server in the first cluster failed;
determining if the clusters include one or more of the active witness servers; and
responsive to a determination that the clusters include one or more of the active witness servers, electing one of the one or more of the active witness servers as the leader server based on a rank associated with the one or more active witness servers.

11. The method of claim 10 further comprising:
responsive to a determination that the clusters do not include the active witness servers, electing one of the shadow witness servers as the leader server.

12. The method of claim 11 further comprising:
obtaining, by the one of the shadow witness servers, information from a replicated copy of the log file stored at a data storage system associated with the one of the shadow witness servers; and
updating, by the one of the shadow witness servers, an in-memory store of the one of the shadow witness servers with the information prior to serving a read-write request from the client computing system.

13. The method of claim 1, wherein the region is a portion of the data associated with the distributed computing system.

14. A computer-readable storage medium storing computer-executable instructions, comprising:
instructions for selecting one of multiple computing servers in a distributed computing system as a leader server, wherein the leader server is a computing server assigned to serve a read-write request from a client computing system, wherein a remaining of the computing servers are follower servers, and wherein the leader server replicates a log file associated with the leader server to the follower servers, the log file including a data set received from the client computing system;
instructions for selecting one of the computing servers as an active server, wherein the active server is a computing server assigned to update a distributed data storage system with a log file associated with the active server; and
instructions for selecting some of the computing servers as witness servers, the witness servers including (a) one or more active witness servers that include a replicated copy of the log file and an in-memory store of the leader server and (b) one or more shadow witness servers that include the replicated copy of the log file of the leader server.

15. The computer-readable storage medium of claim 14, wherein the instructions for selecting one of the computing servers as the leader server includes:
instructions for assigning a rank to each of the computing servers,
instructions for setting a timer of a specified duration for each of the computing servers, the specified duration being a function of the rank of the corresponding computing server, wherein the timer of a higher ranked computing server expires before that of a lower ranked computing server,
instructions for determining that a timer of the one of the computing servers expired before that of a remaining of the computing servers, and
instructions for selecting the one of the computing servers as the leader server.

16. The computer-readable storage medium of claim 14 further comprising:
instructions for determining that the leader server failed; and
instructions for electing an active witness server of the one or more active witness servers as the leader server based on a rank associated with the one or more active witness servers.

17. The computer-readable storage medium of claim 14 further comprising:
instructions for determining that the leader server failed;
instructions for electing a shadow witness server of the one or more shadow witness servers as the leader server based on a rank associated with the one or more active witness servers;
instructions for obtaining information from a replicated copy of the log file stored at a data storage system associated with the shadow witness server; and
instructions for updating an in-memory store of the shadow witness server with the information prior to serving the read-write request from the client computing system.

18. A system, comprising:
a processor;
a first module configured to select:
one of multiple computing servers of a distributed computing system as a leader server and a remaining of the computing servers as follower servers, the leader server assigned to serve a data access request from a client computing system, one of the computing servers as an active server, some of the follower servers as active witness servers, the active witness servers including a replicated copy of a log file and an in-memory store of the leader server, and some of the follower servers as shadow witness servers, the shadow witness servers including the replicated copy of the log file of the leader server;

a second module configured to cause the leader server to process the data access request received at the distributed computing from the client computing system, the data access request including a dataset;

a third module configured to cause the leader server to write the dataset to the log file stored at a data storage system associated with the leader server;

a fourth module configured to cause the leader server to replicate the log file and the in-memory store to the active witness servers, and replicate the log file to the shadow witness servers; and a fifth module configured to cause the active server to update a distributed data storage system associated with the active server with the dataset from the log file.

19. The system of claim 18 further comprising:

a sixth module to select one of the computing servers as a next leader server upon a failure of the leader server, the sixth module configured to select one of the computing servers as the next leader server as a function of a rank and a timer associated with each of the computing servers.

* * * * *